United States Patent [19]

Noguchi et al.

[11] Patent Number: 4,877,225
[45] Date of Patent: Oct. 31, 1989

[54] VIBRATION ISOLATOR

[75] Inventors: Takeshi Noguchi, Yokohama; Kazuya Takano, Kamakura; Takashi Kikuchi, Yokohama, all of Japan

[73] Assignee: Bridgestone Corp., Tokyo, Japan

[21] Appl. No.: 176,276

[22] Filed: Mar. 31, 1988

[30] Foreign Application Priority Data

Jun. 29, 1987 [JP] Japan ................... 62-162101

[51] Int. Cl.⁴ ............................ F16F 9/10; F16F 13/00
[52] U.S. Cl. ..................................... 267/140.1; 267/35;
248/562
[58] Field of Search ................... 267/140.1, 136, 140.3,
267/140.5, 141, 141.1, 141.2, 153, 137, 141.3,
293, 292, 294, 257, 258, 263, 201, 35; 248/557,
562, 636

[56] References Cited

U.S. PATENT DOCUMENTS

| | | | |
|---|---|---|---|
| 4,383,679 | 5/1983 | Kakimoto | 267/140.1 |
| 4,660,812 | 4/1987 | Dan et al. | 267/140.1 |
| 4,681,306 | 7/1987 | Hofmann et al. | 267/140.1 |
| 4,709,779 | 12/1987 | Takehara | 267/140.1 |
| 4,754,956 | 7/1988 | Barone et al. | 267/140.1 |

FOREIGN PATENT DOCUMENTS

| | | | |
|---|---|---|---|
| 3410781 | 10/1985 | Fed. Rep. of Germany ... | 267/140.1 |
| 95244 | 6/1985 | Japan . | |
| 0104825 | 6/1985 | Japan | 267/140.1 |
| 0116937 | 6/1985 | Japan | 267/140.1 |
| 0055427 | 3/1986 | Japan | 267/140.1 |

*Primary Examiner*—Douglas C. Butler
*Assistant Examiner*—Mark T. Le
*Attorney, Agent, or Firm*—Oliff & Berridge

[57] ABSTRACT

A vibration isolator mounted on a support for a vehicle engine or the like which is a vibration source, in which a central limitational passage is formed in a partition wall which divides a fluid chamber filled with a fluid into a pair of small fluid chambers, the central limitational passage providing communication between the pair of small fluid chambers. The central limitational passage can be opened or closed by a valve capable of linearly moving so that the resistance to the fluid flowing through the central limitational passage is changed when vibrations occur. Additional connectable small limitational passages are provided in the valve and partition wall to provide communication between the small fluid chambers when the central limitational passage is closed by the valve. With this structure, vibrations can be absorbed over a wide frequency range.

27 Claims, 12 Drawing Sheets

VIBRATION ISOLATOR

BACKGROUND OF THE INVENTION

This invention relates to a vibration isolator which is interposed between a vibration source and an object and which reduces or absorbs vibrations transmitted from the vibration source to the object.

A structure having an expandable fluid chamber and used to constitute a vibration isolator for an engine mount or cab mount is known. A structure in which this fluid chamber is sectioned into a plurality of small fluid chambers has also been proposed.

Vibrations are absorbed by virtue of the resistance to a fluid passing through a limitational passage formed in this structure. An example of a means for changing the size of the limitational passage is disclosed in Japanese Utility Model Laid-Open No. 95244/1985. In this example, a valve element is rotated by an electric motor and is thereby moved relative to an opening so as to change the opening area. It is necessary to provide in this device a certain gap between the valve element and a partition wall in order to enable the valve element to smoothly rotate. However, there is a possibility of the fluid leaking through such a gap, making it difficult to attain desired damping characteristics.

Even if an elastic material is used to press the valve element against the partition wall so as to limit the leak of the fluid, the valve element is displaced by the fluid flowing through the passage when the pressure of the fluid is increased. If the pressing force is increased, the resistance to the rotation of the valve element increases, resulting in the need for a large driving force. In addition, such a rotary motion of the valve element restricts the amount of opening of the passage and makes it difficult to set a large opening area.

Japanese Patent Laid-Open No. 55427/1986 discloses an arrangement for opening and closing the opening section. However, in this arrangement, the limitational passage is simply opened or closed, and the size thereof cannot be changed.

SUMMARY OF THE INVENTION

The present invention has been achieved in consideration of these facts, and an object of the present invention is to provide a vibration isolator capable of controlling vibrations over a wide range.

To this end, the present invention provides a vibration isolator having an expandable fluid chamber interposed between a vibrating portion and a vibration receiving portion, a partition wall which divides the fluid chamber into a plurality of small fluid chambers, a control limitational passage which provides communication between the small fluid chambers, a changing means for changing the size of the central limitational passage by linearly moving itself relative to the central limitational passage, and additional relatively small limitational passages in the changing means and partition wall which are connectable to provide communication between the small fluid chambers when the central limitational passage is substantially closed by the changing means.

Since, in accordance with the present invention, the changing means is adapted to change the size of the central limitational passage by linearly moving itself, the slide resistance of the changing means is smaller than that of the rotary means, and the changing means does not impede the change in the area of opening of the limitational passages. It is therefore possible to change the size of the limitational passages over a wide range.

DESCRIPTION OF THE PREFERRED EMBODIMENTS

Figure 1:
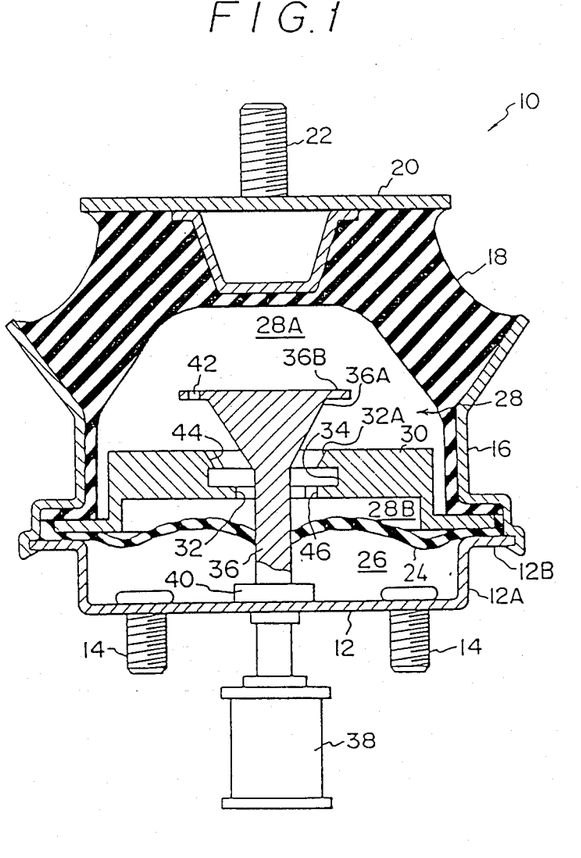
FIG. 1 is a longitudinal sectional view of a vibration isolator which represents a first embodiment of the present invention.

FIG. 1 shows a vibration isolator which represents a first embodiment of the present invention.

A base plate 12 of a vibration isolator 10 is fixed to a body of a vehicle (not shown) by a bolt 14. The base plate 12 has a rising portion 12A which is formed by being bent at right angles at the outer periphery of the base plate. The base plate 12 also has a flange 12B which is formed by being bent at right angles at the end of the rising portion 12A.

The lower end of an outer tube 16 is fixed to the flange 12B by caulking. The outer tube 16 has a tapered portion which is formed at its top end in such a manner that the inside diameter is gradually increased toward the top end. A lower portion of a cylindrical rubber member 18 is bonded by vulcanization to the inner peripheral surface of the outer tube 16, and an upper end portion of the rubber member 18 is bonded by vulcanization to a top plate 20. An engine which is a vibration source (not shown) is mounted on and fixed to the top plate 20 by using a bolt 22 which projects thereabove.

An outer peripheral portion of a diaphragm 24 is fixed to the outer tube 16 and to the flange 12B of the base plate 12 by being pinched therebetween. An air chamber 26 is formed between the diaphragm 24 and the base plate 12. A through hole may be formed in a portion of the base plate 12 in order that the air chamber 26 communicates with the outside.

A fluid chamber 28 is formed inside the outer tube 16 and the rubber member 18 and is closed by the diaphragm 24. The fluid chamber 28 is filled with a fluid such as water or oil.

An outer peripheral portion of a partition wall 30 is fixed to the outer tube 16 and to the diaphragm 24 by being pinched therebetween. The partition wall 30 divides the fluid chamber 28 into an upper small fluid chamber 28A and a lower small fluid chamber 28B.

Figure 2A:
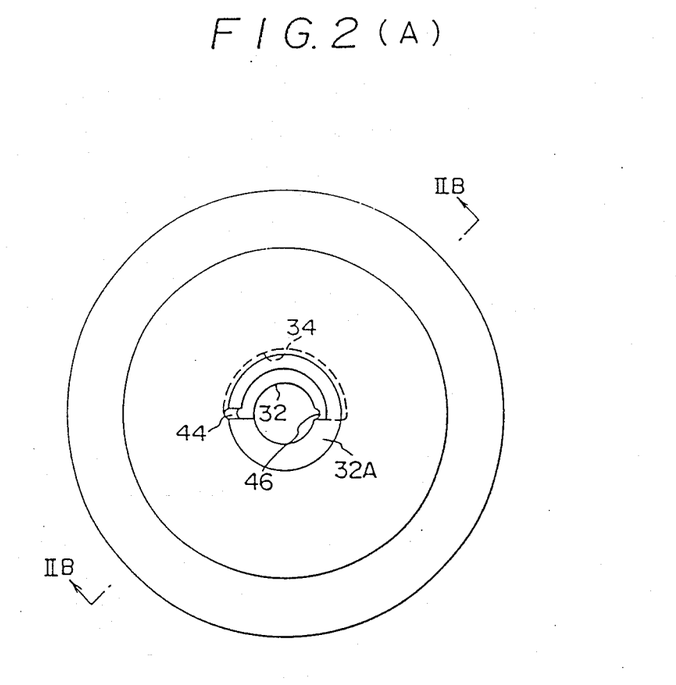
FIG. 2(A) is a plan view of the partition wall shown in FIG. 1.
Figure 2B:
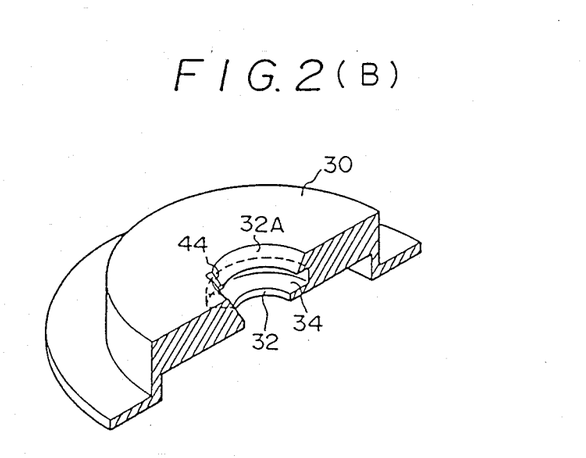
FIG. 2(B) is a perspective view of the partition wall shown in FIG. 2(A) cut along a line IIB—IIB of FIG. 2(A)

A through hole 32 is formed in the partition wall 30 at a position corresponding to the center axis thereof so that it provides communication between the upper small fluid chamber 28A and the lower small fluid chamber 28B. The through hole 32 has an increased-diameter portion 34 which is formed in a thicknesswise-central portion of the partition wall 30 and which defines a semicircle as viewed in FIG. 2 in plan. The through hole 32 also has a tapered portion 32A which is formed between the increased-diameter portion 34 and the upper end of the through hole 32 opened to the upper small fluid chamber 28A in such a manner that the inside diameter of the through hole 32 is gradually increased from a portion adjacent to the increased-diameter portion 34 to that opening end.

A valve 36 passes through the through hole 32. The valve 36 is connected to an actuator 38 which is a drive source fixed to the base plate 12 or the body of the vehicle, and to which a dc motor, solenoid, hydraulic cylinder, or the like can be applied. The valve 36 can reciprocatively move in the direction of its axis (direction of top to bottom or bottom to top of FIG. 1) and can rotate about it axis. An intermediate portion of the valve 36 passes through a bush 40 provided on the base plate 12, without forming any gap between itself and the bush 40. The valve also passes through the diaphragm 24 and reaches the fluid chamber 28. The valve 36 has a tapered portion 36A formed between its intermediate portion to its head, the diameter of the tapered portion 36A being gradually increased from the intermediate portion toward the head of the valve 36. The tapered portion 36A serves as a changing means for changing the opening of the through hole 32 provided as a limitational passage and is capable of closely contacting the tapered portion 32A, as shown in FIG. 3.

Figure 3:
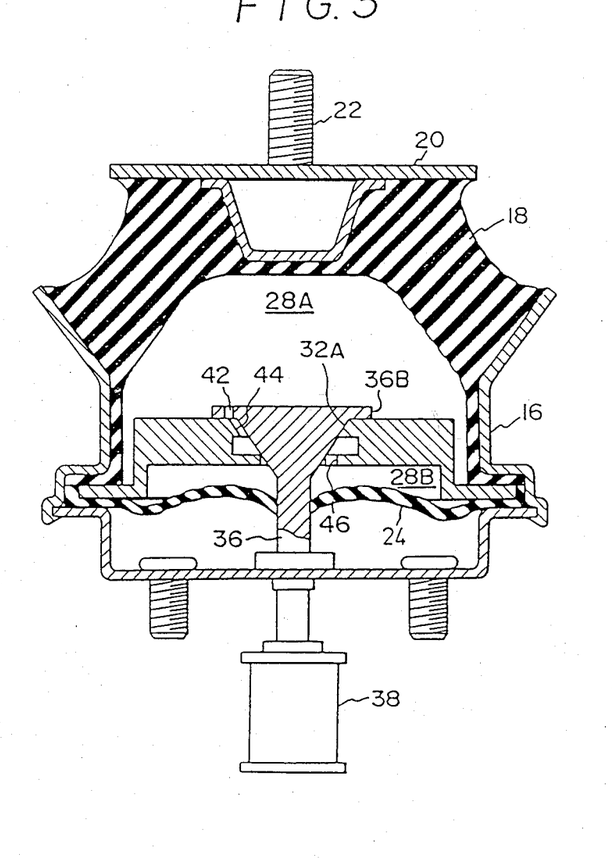
FIGS. 3 and 4 are diagrams corresponding to FIG. 1, illustrating states of operation.

An increased-diameter portion 36B which is formed at the top end of the tapered portion 36A can be brought into close contact with the upper surface of the partition wall 30 when the valve is in the state shown in FIG. 3.

The increased diameter portion 36B has a small opening 42 which can face an end of a semicircular groove 44 formed in an inner peripheral portion of the tapered portion 32A when the increased-diameter portion 36B is brought into close contact with the partition wall 30 as shown in FIG. 3. The groove 44 partially increases the inside diameter of the tapered portion 36A so that it functions, in cooperation with the small opening 42, to provide communication between the upper small fluid chamber 28A and the increased-diameter portion 34 even when the tapered portion 36A closely contacts the tapered portion 32A. A semicircular groove 46 is formed in the inner peripheral surface of the through hole 32 between the increased-diameter portion 34 and the lower small fluid chamber 28B so as to partially increase the inside diameter thereof. The semicircular groove 46 functions to provide communication between the increased-diameter portion 34 and the lower small fluid chamber 28B in the state shown in FIG. 3.

The operation of this embodiment will be described below.

If the engine mounted on the top plate 20 vibrates, the rubber member 18 absorbs the vibration by damping due to internal friction occurring thereinside.

Since, as shown in FIG. 1, the tapered portion 36A of the valve 36 is normally set to an upper position apart from the tapered portion 32A, if the pressure inside the fluid chamber 28 is varied by the vibration of the engine, the fluid flows through the through hole 32 from the upper small fluid chamber 28A to the lower small fluid chamber 28B or flows in the opposite direction so that damping is effected by the viscous resistance at the through hole 32.

If the valve is moved upward or downward by the actuator 38, the distance between the tapered portions 36A and 32A and, hence, the effective area of the through hole 32 are changed, thus enabling the size of the limitational passage to be freely changed.

When the valve 36 is moved downward to the lowermost position as shown in FIG. 3, the increased-diameter portion 36B is brought into close contact with the partition wall 30. In this state, the upper small fluid chamber 28A communicates with the lower small fluid chamber 28B through a longer limitational passage of a reduced sectional area formed by the groove 44, the increased-diameter portion 34, and the groove 46, thereby providing an improved damping effect when the engine shakes.

Figure 4:
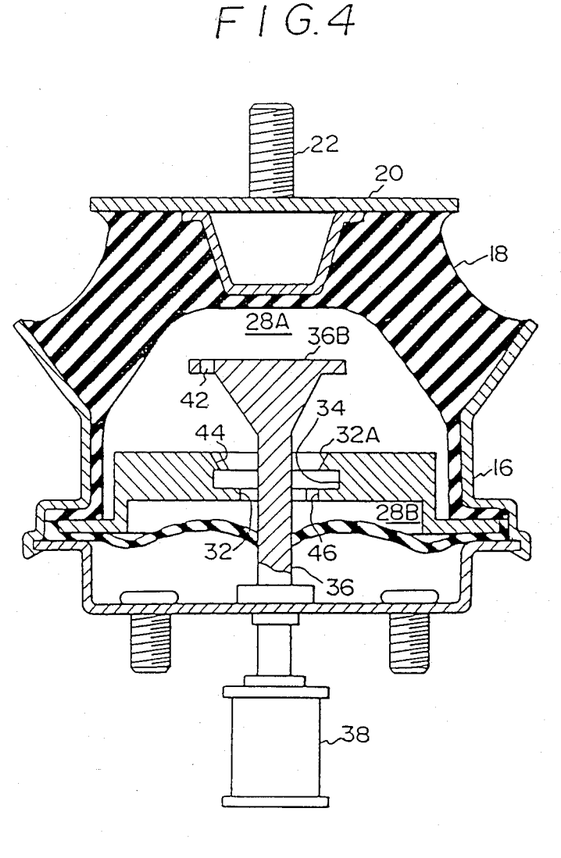

If, conversely, the valve 36 is moved to the uppermost position as shown in FIG. 4, the tapered portion 36A is moved apart from the tapered portion 32A so that the effective area of the through hole 32 greatly increases, thereby maintaining the spring constant at a small value even when high-frequency vibrations occur.

In the above-described embodiment, a portion of the valve 36 passing through the diaphragm 24 is bonded thereto by vulcanization. Otherwise, an O-ring or the like may be interposed therebetween so that the valve 36 and the diaphragm 24 can move relative to each other, or the valve 36 may be press-fitted to a through hole formed in the diaphragm 24.

When the valve 36 is rotated about its axis so that the small opening 42 does not face the groove 44, the upper and lower small fluid chambers 28A and 28B can be isolated from each other by varying degrees, thereby greatly increasing the spring constant when the valve is at least substantially at the end of the stroke of its movement the relatively small limitational passages. To enable the increased-diameter portion 36B to closely contact the partition wall 30, an elastic body such as a rubber member may be attached to the increased-diameter portion 36B or to the partition wall 30.

In the above-described embodiment, the tapered portion 36A and the the increased-diameter portion 36B are provided in the through hole 32 on the side of the upper small fluid chamber 28A. Otherwise, the tapered portion 36A and the the increased-diameter portion 36B may be provided on the side of the lower small fluid chamber 28B while reversing the direction of tapering thereof. However, the provision of the tapered portion 36A on the side of the upper small fluid chamber 28A is preferred when the engine is mounted on the top plate 20, since the increase in the internal pressure of the upper small fluid chamber 28A due to vibrations of the engine is larger than that of the lower small fluid chamber 28B.

In accordance with the above-described embodiment, the length of each of the through hole 32 and the increased-diameter portion 34, etc., which constitute the limitational passage, can be freely determined in accordance with required characteristics.

Figure 5:
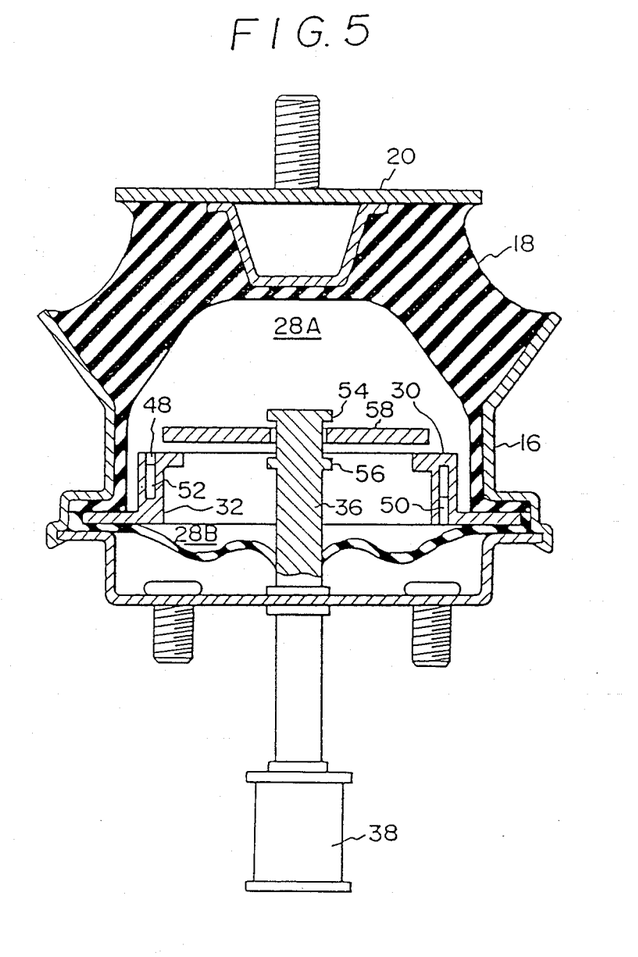
FIGS. 5 and 6 are longitudinal sectional views of second and third embodiments of the present invention.

FIG. 5 shows a second embodiment of the present invention.

In this embodiment, small openings 28A and 23B which open to the upper and lower small fluid chambers 48 and 50, respectively, are formed in the partition wall 30. The small openings 48 and 50 are communicated with each other via a limitational passage 52 which extends in the partition wall 30 generally half round coaxially with the valve 36. Therefore, the upper small fluid chamber 28A communicates with the lower small fluid chamber 28B via the small opening 48, the limitational passage 52, and the small opening 50. The length of the limitational passage can be determined as desired in accordance with required characteristics as in the case of the first embodiment. However, it is preferable to increase the length of the limitational passage in order to realize a high degree of damping effect.

A through hole 32 is formed in the partition wall 30 at the center thereof and so that it serves as a second orifice which provides communication between the upper and lower small fluid chambers 48 and 50 through opening areas larger than that of the limitational passage 52.

The head of the valve 36 reaches the interior of the upper small fluid chamber 28A. The valve 36 retains a vibration plate 58 between an increased-diameter portion 54 formed at its head and and an increased-diameter portion 56 formed in parallel with the increased-diameter portion 54. The distance between the increased-diameter portions 54 and 56 is larger than the thickness of the vibration plate 58, and, therefore, the vibration plate 58 can vibrate in the axial direction of the valve 36.

In this embodiment, the limitational passage 52 and the through hole 32 are communicated with the upper and lower small fluid chambers 28A and 28B, and the increased-diameter portion 54 can press the vibration chamber 58 against the through hole 32 and thereby close the opening thereof when the valve 36 linearly moves in the axial direction, thereby enabling the upper and lower small fluid chambers 28A and 28B to be communicated with each other via the limitational passage 52 alone.

When the frequency of vibration is high, the valve 36 is lifted so that the vibration plate 58 can vibrate between the increased-diameter portions 54 and 56, thereby limiting the increase in the internal pressure of the upper small fluid chamber 28A and, hence, increase in the spring constant.

In accordance with this embodiment, the increased-diameter portion 56 may be omitted so that the vibration plate 58 can freely move in the direction of the actuator 38 and can be brought into contact with the through hole 32 by the increased-diameter portion 54 when required. In this case, it is preferable to equalize the specific gravity of the vibration plate 58 to that of the fluid in the fluid chamber 28.

The structure can be simplified depending on required characteristics by forming the increased-diameter portion 54 and the vibration plate 58 in one united body.

Figure 6:
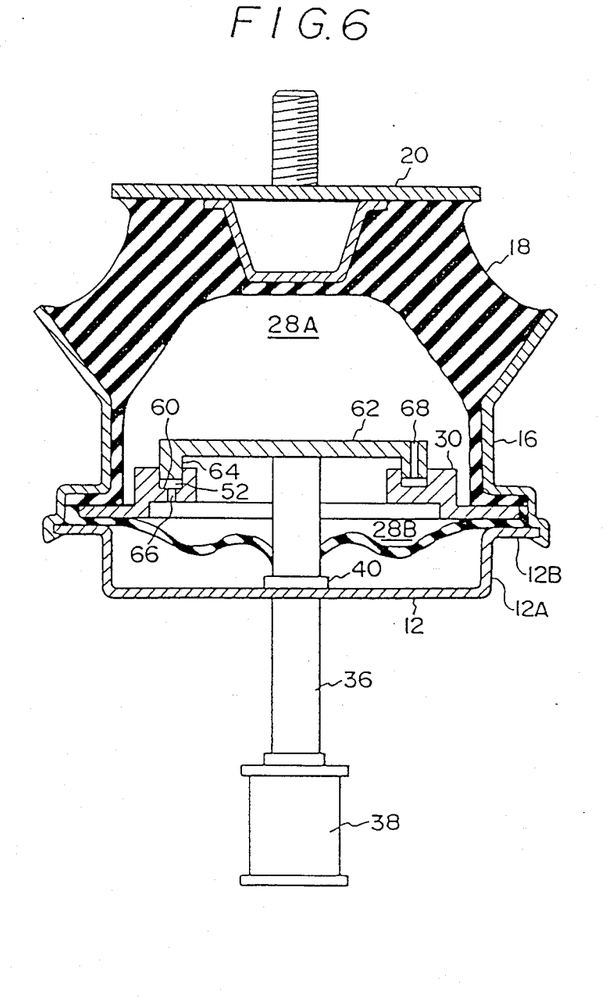
Figure 7:
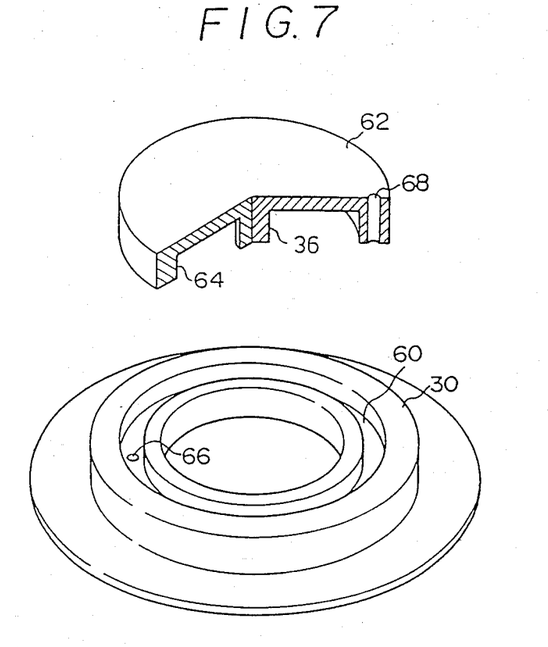
FIG. 7 is a perspective view of a partition wall and a related component of the third embodiment.

FIGS. 6 and 7 show a third embodiment of the present invention.

A channel 60 in the form of a ring is formed in the upper-end surface of the partition wall 30, as shown in FIG. 7. A rib 64 which projects from an outer peripheral portion of a circular plate 62 attached to the head of the valve 36 can be fitted into the ring channel 60. A small opening 66 opened to the lower small fluid chamber 28B is formed in a bottom portion of the ring channel 60 while a small opening 68 opened to the upper small fluid chamber 28A is formed in a portion of the rib 64.

Therefore, in accordance with this embodiment, the sectional area of the limitational passage 52 formed between the rib 64 and the ring channel 60 can be changed by moving the valve 36 upward or downward, while the upper and lower small fluid chambers 28A and 28B are communicated with each other via the limitational passage 52 and the small openings 66 and 68, thereby enabling vibrations to be absorbed over a wide frequency range. The distance between the small openings 66 and 68, namely, the length of the limitational passage 52 can be changed by rotating the valve 36.

Figure 8:
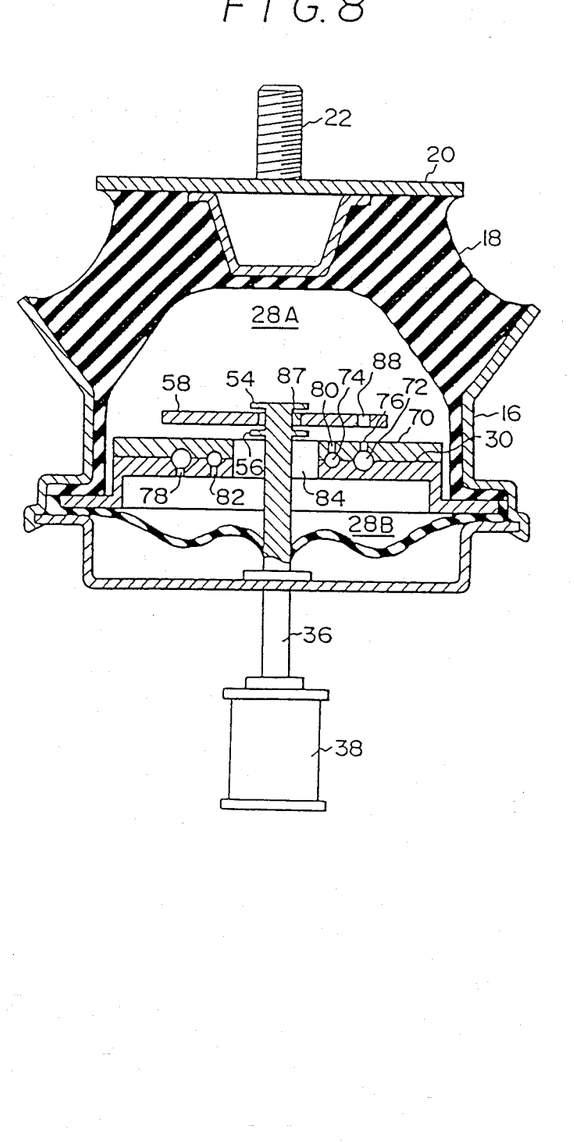
FIG. 8 is a cross-sectional view of a fourth embodiment of the present invention.
Figure 9:
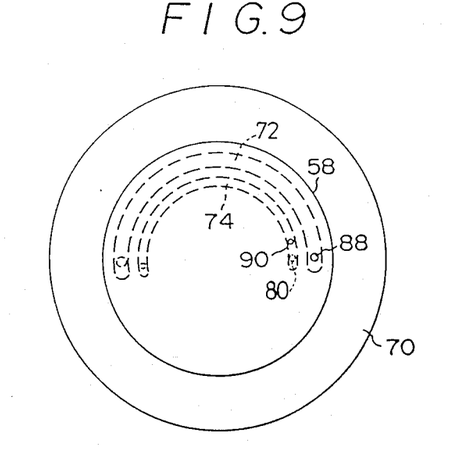
FIG. 9 is a plan view of a partition wall of the fourth embodiment.
Figure 10:
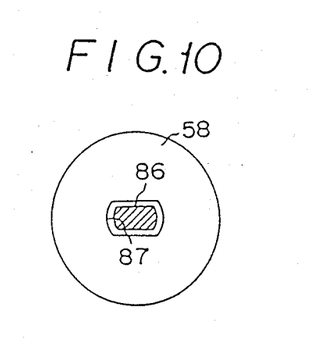
FIG. 10 is a cross-sectional view of the relationship between a valve and a vibration plate of the fourth embodiment in the mounted state, as viewed in the axial direction of the valve.

FIGS. 8 to 10 show a fourth embodiment of the present invention.

In this embodiment, a top plate 70 is fixed to the upper-end surface of the partition wall 30. A larger limitational passage 72 and a smaller limitational passage 74 are formed coaxially with each other between the top plate 70 and the upper end of the partition wall 30. That is, the larger and smaller limitational passages 72 and 74 are constituted by pairs of grooves which have semicircular cross sections and which are formed in the surfaces of the top plate 70 and the partition wall 30 facing each other in such a manner that their longitudinal axes extend around the valve 36 generally half round, as shown in FIG. 9. These semicircular grooves form the larger and smaller limitational passages 72 and 74 having circular cross sections when the top plate 70 and the partition wall 30 are closed to each other.

The semicircular grooves may be made longer or shorter depending on required characteristics as in the case of the above described embodiments.

Circular cross-sectional configurations of the passages are preferred. However, the passages may have other cross-sectional configurations such as rectangles.

One axial end of the larger limitational passage 72 is communicated with the upper small fluid chamber 28A via a small opening 76 formed in the top plate 70 while the other axial end is communicated with the lower small fluid chamber 28B via a small opening 78 formed in the partition wall 30. Similarly, one axial end of the smaller limitational passage 74 is communicated with the upper small fluid chamber 28A via a small opening 80 formed in the top plate 70 while the other axial end is communicated with the lower small fluid chamber 28B via a small opening 82 formed in the partition wall 30.

A large aperture 84 is formed in the partition wall 30 and in the top plate 70 at the centers thereof, thereby providing communication between the upper and lower small fluid chambers 28A and 28B while allowing the head of the valve 36 to project into the upper small fluid chamber 28A. The valve 36 has at its head increased-diameter portions 54 and 56, and a vibration plate 58 which can vibrate in the axial direction of the valve 36, as in the case of the second embodiment. However, as shown in FIG. 10, the valve 36 has at its head a shaped shaft portion 86 which is not circular and which is adapted to be engaged with the vibration plate 58. The hole 87 of the vibration plate 58 has a shape corresponding to that of the shaft portion 86. Thus, the torque of the valve 36 can be transmitted to the vibration plate 58. As shown in FIG. 9, the vibration plate 58 has small openings 88 and 90 which can face the small openings 76 and 80, respectively, when the valve 36 is moved downward.

The vibration plate 58 may be made unmovable relative to or fixed to the valve 36.

In accordance with the present invention, the fluid in the upper and lower small fluid chambers 28A and 28B moves mainly through the large aperture 84. Therefore, the internal pressure does not greatly increase even when the frequency of vibration is high, so that the dynamic spring constant can be maintained at a small value. This is specifically effective for a case in which noise like a muffled sound occurs.

As the valve 36 is linearly moved downward, the vibration plate 58 is brought into close contact with the top plate 70 so that the small opening 88 formed in the vibration plate 58 is brought close to the small opening 76 in alignment therewith. The fluid is thereby allowed to flow from the upper small fluid chamber 28A to the lower small fluid chamber 28B via the small opening 88, the small opening 76, the larger limitational passage 72, and the small opening 78, or flow in the opposite direction. Therefore, the resistance to the fluid flowing through the larger limitational passage 72 makes the spring constant small at the time of engine idling.

If the valve 36 is rotated so that the small opening 90 of the vibration plate 58 is brought into alignment with the small opening 80, the fluid is allowed to flow from the upper small fluid chamber 28A to the lower small fluid chamber 28B via the small opening 90, the small opening 80, the smaller limitational passage 74, and the small opening 82, or flow in the opposite direction. The smaller limitational passage 74 enables vibrations from the engine to be effectively absorbed. In this case, improved damping properties suitable for reducing vibrations of the engine when the engine shakes can be obtained. Thus, it is preferable to dispose the openings in such a manner that the small opening 88 is not brought into alignment with the small opening 76 when the small opening 90 faces the small opening 80.

In accordance with this embodiment, it is possible to set the frequency of resonance of the fluid flowing through the smaller limitational passage 74 to about 10 Hz since the sectional area of the smaller limitational passage 74 is smaller than that of the larger limitational passage 72.

If the valve 36 is further rotated so that neither of the small openings 88 and 90 of the vibration plate 58 communicate with the corresponding small openings 76 and 80, the upper and lower small fluid chambers 28A and 28B are completely isolated from each other so that the internal pressure of the upper small liquid chamber 28A can be increased, thereby obtaining a higher spring constant. It is therefore possible to minimize the extent to which the engine moves when, for example, a high acceleration of the vehicle occurs.

Instead of being rotated after the vibration plate 58 has been brought into close contact with the top plate 70, the valve 36 may be moved in the axial direction after being rotated so that the small opening 88 or 90 faces the small opening 76 or 80. The friction between the vibration plate 58 and the top plate 70 is thereby reduced. Otherwise, the valve 36 may be moved downward from the state shown in FIG. 8 while rotating the vibration plate 58, in other words, effecting screw motion of the small openings 88 and 90.

It is preferable to set the sectional areas of the small openings 88 and 90 to be larger than those of the corresponding small holes 76, 78, 80 and 82 of the limitational passages.

The vibration plate 58 vibrates in the state shown in FIG. 8 when the internal pressure of the upper small fluid chamber 28A increases, thereby limiting the increase in the internal pressure of the lower small fluid chamber 28B. It is therefore possible to deal with vibrations of very high frequencies.

Figure 11:
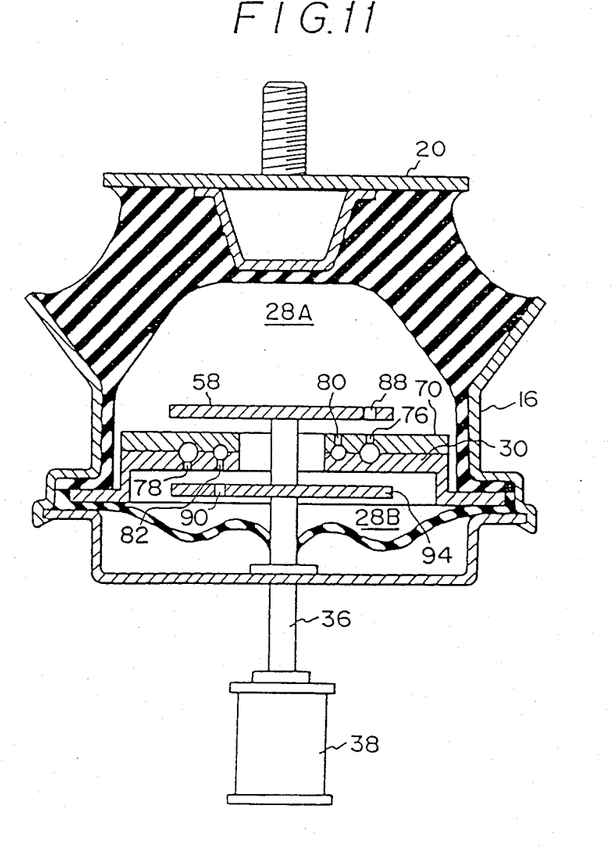
FIGS. 11 and 12 are cross-sectional views of fifth and sixth embodiments of the present invention.

FIG. 11 shows a fifth embodiment of the present invention.

This embodiment has, in addition to the components of the former embodiment, a circular plate 94 which is fixed to the valve 36 and is positioned in the lower small fluid chamber 28B. In this embodiment, only the small opening 88 is formed in the vibration plate 58. The small opening 88 can face the small opening 76. A small opening 90 is formed in the circular plate 94, and it can face the small opening 82.

Therefore, in accordance with this embodiment, the small opening 88 can be brought close to the small opening 76 in alignment therewith as the valve 36 is linearly and downwardly moved from the position shown in FIG. 11, and the small opening 90 can be brought close to the small opening 82 in alignment therewith as the valve 36 is linearly moved upward. It is thereby possible to select the larger limitational passage 72 or the smaller limitational passage 74.

The circular plate 94 may be relatively movably attached to the valve 36 as in the case of the vibration plate 58 of the above-described embodiments.

It is also preferable to set the sectional areas of the small openings 88 and 90 to be larger than those of the corresponding small holes 76, 78, 80 and 82 of the limitational passages.

Figure 12:
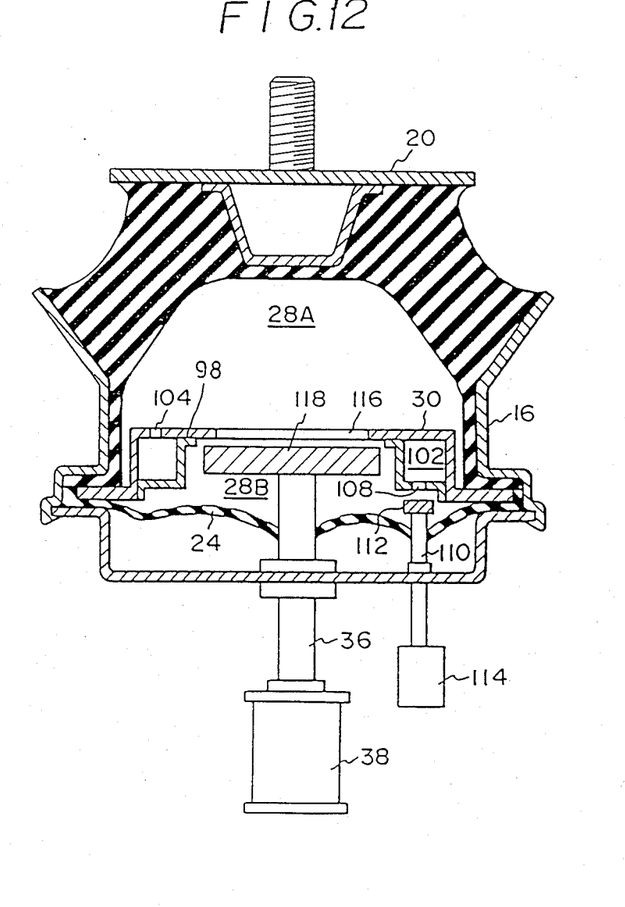
Figure 13:
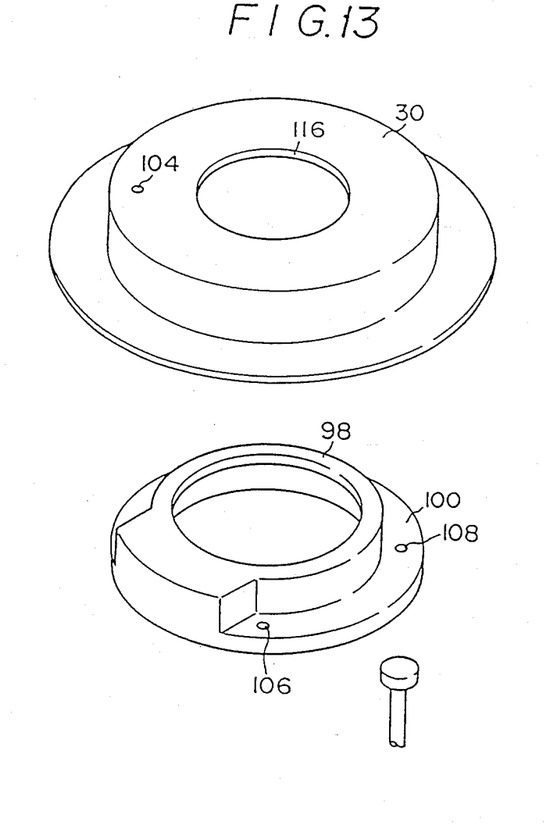
FIG. 13 is an exploded perspective view of a partition wall and related components of the sixth embodiment.

FIGS. 12 and 13 show a sixth embodiment of the present invention in which an abutment plate 98 is fixed to inner surfaces of the partition wall 30. The abutment plate 98 has a recess 100 such as that shown in FIG. 13, and a limitational passage 102 which is C-shaped as viewed in plan is formed between the abutment plate 98 and the partition wall 30. The limitational passage 102 is communicated with the upper small fluid chamber 28A via a small opening 104 formed in the partition wall 30 and with the lower small fluid chamber 28B via a small opening 106 formed in a portion of the abutment plate 98 facing the recess 100.

A small opening 108 is formed in the abutment plate 98 at an intermediate portion of the limitational passage 102, and a pad 112 which is attached to an end of the rod 110 faces the small opening 108. The other end of the rod 110 is connected to an actuator 114, and an intermediate portion of the rod 110 passes through the diaphragm.

If the actuator 114 extends the rod 110, the pad 112 closes the small opening 108 so that the effective length of the limitational passage 102 is defined as between the small openings 104 and 106. If the pad 112 is moved away from the small opening 108, the effective length of the limitational passage 102 is defined as between the small opening 104 and the small opening 108, thus changing the length of the limitational passage.

A circular plate 118 which is attached to the head of the valve 36 faces a large aperture 116 which is formed at the center of the partition wall 30 in such a manner that the circular plate 118 can close or open the large aperture 116.

The number of combinations of the small opening 108 and the rod 110 is not limited to one, and a plurality of pairs of these members can be provided at intermediate portions of the limitational passage 102.

In this embodiment also, vibrations can be absorbed over a wide frequency range by moving the circular plate 118 up and down so as to open or close the large aperture 116 or change the degree of opening thereof.

As described above, the vibration isolator in accordance with the present invention is provided with an expandable fluid chamber interposed between a vibrating portion and a vibration receiving portion, a partition wall which divides this fluid chamber into a plurality of small fluid chambers, a limitational passage which provides communication between the small fluid chambers, and a changing means which linearly moves relative to the limitational passage so as to change the size thereof. This device can absorb vibrations over a wide frequency range and is, therefore, highly effective.

What is claimed is:

1. A vibration isolator interposed between a vibration source and a vibration receiving object and adapted to reduce and absorb vibrations transmitted from said vibration source to said object, said vibration isolator comprising:

a fluid chamber partially formed of an elastic body to expand and contract by vibrations, said fluid chamber being filled with a fluid;

a partition wall for dividing said fluid chamber into a plurality of small fluid chambers;

a relatively large central limitational passage through said partition wall capable of providing communication between said small fluid chambers;

changing means for changing the area of said central limitational passage by linearly moving itself close to or away from said central limitational passage, said changing means including a valve which abuts against said partition wall when said valve is at least substantially at the end of the stroke of its movement to at least substantially close said central limitational passage; and first and second relatively small limitational passages through said partition wall and said valve, respectively, said first and second limitational passages being connectable to provide communication between said small fluid chambers when said valve is at least substantially at the end of the stroke of its movement, and said changing means also adapted to control the flow of said fluid through said small limitational passages;

whereby the rate at which said fluid moves between said small fluid chambers is changed so as to enable vibrations from said vibration source to be absorbed over a wide range.

2. A vibration isolator according to claim 1, wherein said changing means passes through said central limitational passage and changes the area of said central limitational passage through which said fluid flows, by changing the extent to which said changing means projects into one of said small fluid chambers.

3. A vibration isolator according to claim 1, wherein the outside diameter of said valve is not constant, and said valve changes the area of opening of said central limitational passage by changing the extent to which said valve moves.

4. A vibration isolator according to claim 3, wherein said valve has a tapered outside configuration.

5. A vibration isolator according to claim 4, wherein at least a portion of said central limitational passage has a tapered configuration which coincides with said tapered outside configuration of said valve.

6. A vibration isolator according to claim 5, wherein said central limitational passage is enlarged at a portion thereof in the diametral direction so as to form a groove which serves as a portion of said first limitational passage and provides communication between said small fluid chambers at the end of said stroke of said valve.

7. A vibration isolator according to claim 1, wherein said valve passes through said central limitational passage and has an outer peripheral portion of a constant outside diameter and an outer peripheral portion of a non-constant outside diameter, said outer peripheral portions defining different areas of opening of an orifice formed between said valve and an inner periphery of said central limitational passage depending upon different strokes of said valve.

8. A vibration isolator according to claim 7, wherein said non-constant-diameter portion has a tapered configuration.

9. A vibration isolator according to claim 1, wherein said valve passes through said central limitational passage and has a vibration plate mounted thereon, said valve being capable of pressing said vibration plate against said central limitational passage when said valve moves.

10. A vibration isolator according to claim 1, wherein said valve is rotatable about its axis, and said first and second limitational passages are disconnectable upon rotation of said valve.

11. A vibration isolator according to claim 10, wherein third and fourth relatively small limitational passages are provided through said partition wall and said valve, respectively, said third and fourth limitational passages being connectable to provide communication between said small fluid chambers at the end of said stroke of said valve when said first and second limitational passages are disconnected by rotation of said valve.

12. A vibration isolator according to claim 1, wherein said changing means includes a vibration plate capable of closing said central limitational passage, said vibration plate being also capable of vibrating when it does not close said central limitational passage.

13. A vibration isolator according to claim 11, wherein said first and second and said third and fourth limitational passages are selectively disconnectable by bringing said changing means into contact with said partition wall while selecting angles of said changing means.

14. A vibration isolator according to claim 11, wherein said first and second and said third and fourth limitational passages are respectively disconnectable by bringing portions of said changing means disposed on opposite sides of said partition wall into contact therewith.

15. A vibration isolator according to claim 11, wherein said first and third limitational passages through said partition wall have different sectional areas.

16. A vibration isolator according to claim 1, wherein said first limitational passage is formed by inserting a part of said changing means into a groove formed in said partition wall.

17. A vibration isolator according to claim 16, wherein said changing means is capable of rotating as well as linearly moving so that the length of said first limitational passage can be changed.

18. A vibration isolator according to claim 17, wherein said groove is in the form of a ring, and said changing means has a rib which enters said groove.

19. A vibration isolator comprising:
a vibration receiving portion supported on a vehicle body;
a supporting portion for supporting a vibration source;
an expandable fluid chamber partially formed of an elastic body and disposed between said vibration receiving portion and said supporting portion, said fluid chamber being filled with a fluid;
a partition wall for dividing said fluid chamber into a pair of small fluid chambers;
a relatively large central limitational passage formed through said partition wall and adapted to provide communication between said small fluid chambers;
a valve means including a valve passing through said central limitational passage and adapted to open and substantially close said central limitational passage by moving itself in the direction of its axis and abutting against said partition wall when said valve is at least substantially at the end of the stroke of its movement; and
first and second relatively small limitational passages through said partition wall and said valve, respectively, said first and second limitational passages being connectable to provide communication between said small fluid chambers when said valve is at least substantially at the end of the stroke of its movement, and said valve means also adapted to control the flow of said fluid through said small limitational passages.

20. A vibration isolator according to claim 19, wherein said valve has an increased-diameter portion which is positioned in one of said small fluid chambers on the side of said supporting portion.

21. A vibration isolator according to claim 20, wherein said central limitational passage and said increased-diameter portion have tapered portions which can be brought into close contact with each other.

22. A vibration isolator according to claim 19, further comprising means for rotating said valve about the axis thereof, wherein said first and second limitational passages are disconnectable upon rotation of said valve.

23. A vibration isolator according to claim 22, wherein third and fourth relatively small limitational passages are provided through said partition wall and said valve, respectively, said third and fourth limitational passages being connectable to provide communication between said small fluid chambers at the end of said stroke of said valve when said first and second limitational passages are disconnected by rotation of said valve.

24. A vibration isolator according to claim 19, wherein a vibration plate is mounted on said valve, and the vibration of said vibration plate is limited when said vibration plate is pressed against said partition wall by the movement of said valve.

25. A vibration isolator according to claim 19, wherein said first limitational passage is formed by inserting a part of said valve into a groove formed in said partition wall.

26. A vibration isolator according to claim 25, wherein said valve is capable of rotating as well as linearly moving so that the length of said first limitational passage can be changed.

27. A vibration isolator comprising:
a vibration receiving portion supported on a vehicle body;
a supporting portion for supporting a vibration source;
an expandable fluid chamber partially formed of an elastic body and disposed between said vibration receiving portion and said supporting portion, said fluid chamber being filled with a fluid;
a partition wall for dividing said fluid chamber into a pair of small fluid chambers, said partition wall having a relatively large central opening through which said small fluid chambers communicate with each other;
a valve means including a valve passing through said central opening of said partition wall and abutting against said partition wall when said valve is at least substantially at the end of the stroke of its movement to at least substantially close said central opening, a central limitational passage being formed between said valve and said central opening, and further including a
driving means for driving said valve in the axial direction thereof so as to change the area of opening of said central limitational passage ; and
first and second relatively small limitational passages through said partition wall and said valve, respectively, said first and second limitational passages being connectable to provide communication between said small fluid chambers when said valve is at least substantially at the end of the stroke of its movement, and said valve means also adapted to control the flow of said fluid through said small limitational passages.

* * * * *